United States Patent [19]

Nutter

[11] Patent Number: 5,287,030
[45] Date of Patent: Feb. 15, 1994

[54] ELECTRIC MOTOR CONSTRUCTION

[75] Inventor: Robert G. Nutter, Fort Wayne, Ind.

[73] Assignee: Electric Motors and Specialties, Inc., Garrett, Ind.

[21] Appl. No.: 855,533

[22] Filed: Mar. 23, 1992

[51] Int. Cl.⁵ .............................................. H02K 5/00
[52] U.S. Cl. .................................... 310/89; 310/258
[58] Field of Search ................ 310/89, 90, 91, 254, 310/258; 29/596

[56] References Cited

U.S. PATENT DOCUMENTS

| 2,053,425 | 9/1936 | Else | 172/36 |
|---|---|---|---|
| 3,700,940 | 10/1972 | Sigl | 310/50 |
| 3,711,732 | 1/1973 | Gerber et al. | 310/162 |
| 3,824,684 | 7/1974 | Wheeler | 29/596 |
| 3,873,861 | 3/1975 | Halm | 310/43 |
| 3,874,073 | 4/1975 | Dochterman et al. | 29/598 |
| 4,100,440 | 7/1978 | Binder et al. | 310/89 |
| 4,173,822 | 11/1979 | Futterer et al. | 29/596 |
| 4,286,187 | 8/1981 | Binder | 310/89 |
| 4,355,253 | 10/1982 | Vollbrecht | 310/239 |
| 4,573,258 | 3/1986 | Io et al. | 29/596 |
| 4,641,422 | 2/1987 | Weaver | 29/598 |
| 4,659,950 | 4/1987 | Gotoh | 310/89 |
| 4,682,065 | 7/1987 | English et al. | 310/90 |
| 4,720,650 | 1/1988 | Hanamori et al. | 310/266 |
| 4,737,673 | 4/1988 | Wrobel | 310/90 |
| 4,746,828 | 5/1988 | Nado et al. | 310/90 |
| 4,795,926 | 1/1989 | Someya et al. | 310/90 |
| 4,823,032 | 4/1989 | Ward et al. | 310/43 |
| 4,862,582 | 9/1989 | Henck | 29/596 |
| 4,899,432 | 2/1990 | Adam et al. | 29/596 |
| 4,955,791 | 9/1990 | Wrobel | 417/354 |

OTHER PUBLICATIONS

VESPEL Publication by DuPont Company, Using Vespel Bearings, Design and Technical Data, pp. 1-13.
VESPEL Publication by DuPont Company, Quick Facts, VESPEL Parts and Shapes.

Primary Examiner—Emanuel T. Voeltz
Assistant Examiner—Matthew Nguyen
Attorney, Agent, or Firm—Pearne, Gordon, McCoy & Granger

[57] ABSTRACT

A reliable long-life subfractional horsepower electric motor comprising stator and rotor assemblies The stator assembly includes injection molded thermoplastic end housings and plastic bearing inserts shrink fitted into the end housings. The rotor assembly includes a shaft with a special ground finish that affords a long service life and the bearing material includes solid lubricant that coats the shaft to make it corrosion resistant thereby allowing the shaft to be made of inexpensive material such as plain carbon steel. The disclosed motor construction affords a significant reduction in the number of parts and production procedures as compared to prior art long-life motors to effect a significant reduction in manufacturing cost.

2 Claims, 5 Drawing Sheets

ELECTRIC MOTOR CONSTRUCTION

BACKGROUND OF THE INVENTION

The invention relates to improvements in subfractional horsepower long-life electric motors.

Subfractional horsepower electric motors manufactured for long-life service are shown, for example, in U.S. Pat. No. 2,053,425. A typical application of such motors is for air circulation in refrigeration apparatus. Generally, such motors include bearing lubrication systems which provide for self-recirculation of a small quantity of oil to ensure a long service life and high reliability. It is critical in this type of motor that the original supply of oil be confined in a zone which is perfectly leak-proof because any leakage, however small, will eventually lead to premature failure of the motor. The oil circuitry may include an oil reservoir, a wick and oil grooves on a shaft or bearing to produce a supply of lubricant along the length of the bearing Typically, this oil supply and recirculation circuitry involves a number of parts and labor content that add to the cost of the motor In cold environments, the viscosity of the oil can make it difficult to ensure full lubrication so that premature failure of the bearing and therefore the motor may occur.

U.S. Pat. No. 4,746,828 illustrates an electric motor construction in which the end housings are injection molded plastic parts attached to a stack of stator laminations with tie rods running through the stack.

SUMMARY OF THE INVENTION

The invention provides a novel construction for a long-life, high-reliability subfractional horsepower electric motor of the induction type. The motor housing is formed of plastic material, typically thermoplastic material, that is precision injection molded to substantially finished condition and requires essentially no additional fabrication steps such as machining and no finishing steps such as painting. The motor housing is formed of two end units which cradle a stack of stator laminations therebetween. Rotor shaft bearings disposed in each end housing are preferably of a unique plastic material that has self-lubricating qualities.

The disclosed motor assembly when compared to prior constructions for extended life applications is greatly simplified. This simplification in design, wherein conventional lubrication oil is eliminated, affords a motor construction which is inherently less expensive to manufacture. In particular, the labor content in the disclosed motor is greatly reduced. This labor content reduction permits the motor to be constructed with a premium type of bearing material which, although in its presently preferred form, is relatively expensive and still achieve an overall reduction in cost. Since the disclosed motor has substantially fewer parts than known prior long-life designs, it offers the potential of fewer premature failures from possible undetected flaws in material or workmanship.

In accordance with an important feature of the invention, it has been found that a long-life but economic construction can be obtained where the rotor shaft is ground to a super-fine finish. Further, the plastic bearing includes solid materials such as teflon and graphite which deposit in a thin protective layer on the rotor shaft when the motor is first run. This phenomena is put to advantage in the manufacture of the motor of the invention by running in the shaft in the bearing in each motor, preferably by electrically energizing and operating each motor during the manufacturing process. This can be done as part of a quality check of 100% of the production to monitor the electrical operational characteristics of the motor. A plain carbon steel rotor shaft can thereby be protected against corrosion in its journal area without the cost of separate manufacturing steps or materials.

The motor end housings are assembled around a stack of laminations forming the stator. The end housings are held in assembled position by tension elements that are disposed externally of both the stator and end housings. This unique construction of the tension elements simplifies assembly operations for a reduction in labor or of automatic assembly procedures. The tension elements are in the form of flat stock spring clips that are inexpensive to produce, are vibration-proof and allow a controlled degree of thermal expansion of the various motor parts without significant unwanted reaction forces being developed. Additionally, the tension elements avoid the expense and assembly inefficiency associated with tension bolts and nuts commonly used in the prior art.

The bearing of each end housing, in accordance with the invention, is assembled into a cavity molded into its end wall. The bearing is pressed into the cavity while the thermoplastic material of the end wall is still at an elevated temperature from its molding process so that a tight shrink fit between the bearing and its cavity is achieved when the end housing finally cools. The shrink-fit assures a permanent fit between the plastic components. Once the bearing is assembled in the cavity, it is machined in a boring process with a tool that is indexed with a circular surface molded on the end housing.

DESCRIPTION OF THE PREFERRED EMBODIMENT

Figure 1:
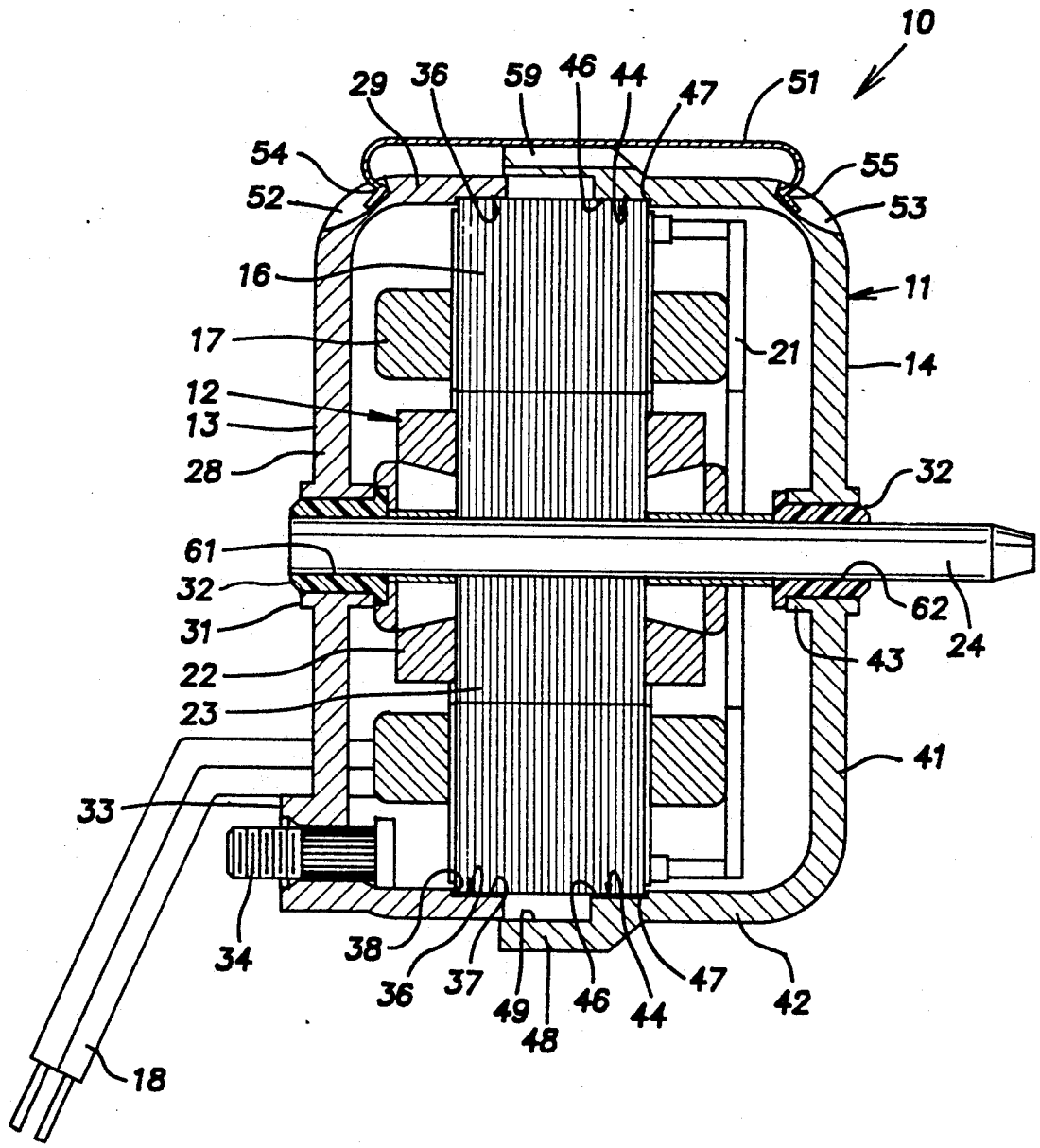
FIG. 1 is a cross-sectional view of a motor constructed in accordance with the invention taken in a plane along the axis of the motor shaft.

Referring now to the drawings, there is shown a motor 10 which is of the induction type and has a subfractional horsepower capacity being in the order of, for example, of an output capacity of generally not more than 50 watts which is 0.067 horsepower. The general type of motor described herein is useful in constructions that are generally not greater than 0.1 horsepower. The disclosed motor 10 is useful in applications where exceptionally long-life and high reliability are requisite. For example, a life of 10 years of generally continuous operation can be expected. A typical application for such motors is to drive air circulation fans in commercial refrigeration equipment. These refrigeration air handling applications are usually characterized by high humidity conditions.

The motor 10 includes a stator assembly 11, a rotor assembly 12 and a pair of opposed end housings 13, 14. The stator assembly 11 includes a stack or core of annular laminations 16 on which are wound electrical field windings 17 in accordance with generally conventional practice. The windings 17 are energized through leads 18 that extend through an aperture 19 in a rear one of the end housings 13. A board 21 of the stator assembly 11 is supported on the laminations 16 for mounting electrical componentry for the windings 17. The rotor assembly 12 includes a die-cast squirrel cage unit 22 with a stack of annular laminations 23 constructed in a generally conventional manner. The squirrel cage unit 22 with the laminations 23 are permanently assembled on a cylindrical shaft 24 such as by a press fit of the shaft into the unit 22. The shaft 24 is preferably of constant diameter except for a machined flat or keyway as desired where it projects from the front end housing for coupling with a load.

The end housings 13, 14, which are similar to one another, have a cup or bell shape and are preferably formed by precision injection molding techniques known in the injection molding industry. Each of the housings 13, 14 is substantially in its finished form when ejected from the associated molding cavity and requires essentially no finishing work in the nature of machining, trimming, painting or the like. Preferably the housings 13, 14 are formed of a thermoplastic material with a mineral or glass fiber filler for improved mechanical properties.

Figure 2:
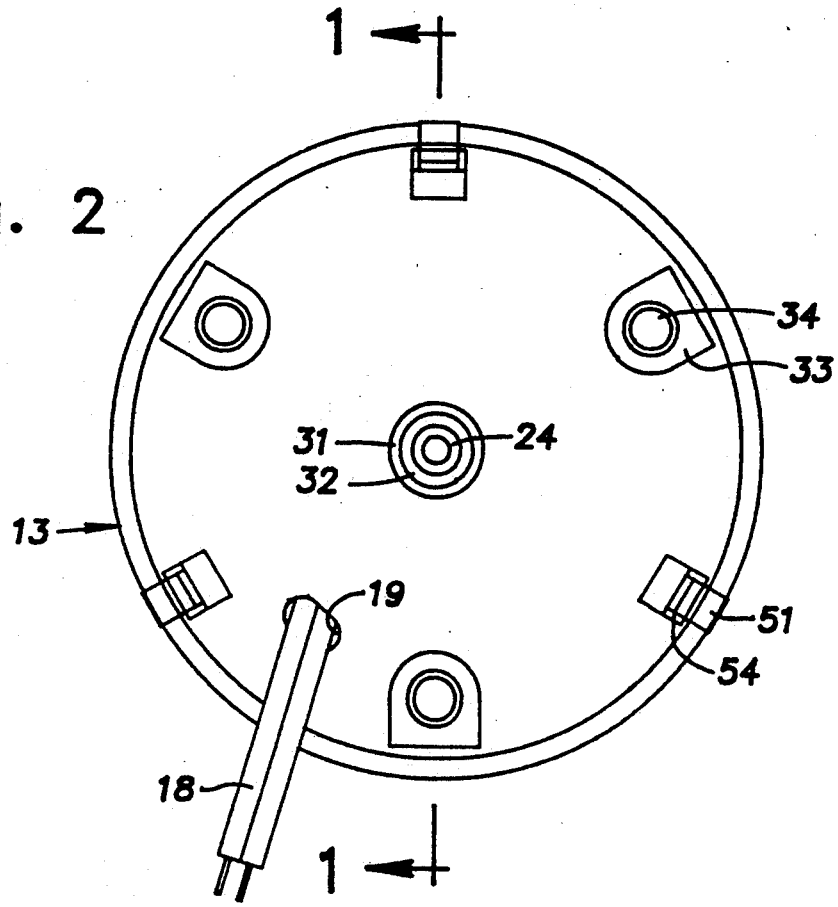
FIG. 2 is an axial end view of a rear or mounting end of the motor.
Figure 3:
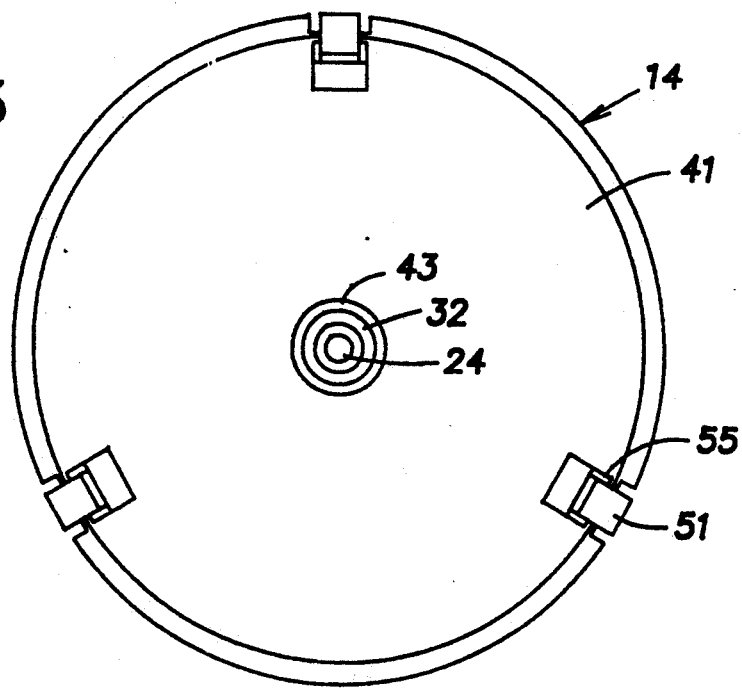
FIG. 3 is an axial view of a forward or shaft end of the motor.

With reference to the rear end housing 13 (FIG. 2) this component has a circular shape when viewed from the respective rear end of the motor along the axis of the shaft 24. This rear housing 13 includes a generally circular end wall 28 extending radially with respect to the axis of the shaft 24 and a generally cylindrical skirt or sidewall 29 extending axially inwardly from the end wall 28. The thickness of the end wall 28 and skirt 29 is, for the most part, uniform throughout the body of the housing 13. A central boss 31 in the end wall 28 supports a shaft bearing 32. A set of three axially extending bosses 33, with a uniform angular spacing with reference to the motor axis, project rearwardly from the end wall 28 adjacent its perimeter. In each of these bosses 33 is anchored a threaded screw 34 projecting from the boss for purposes of mounting the motor 10. On the inside of the sidewall 29 along its free edge remote from the end wall 28, there is formed a counterbore 36 having a cylindrical surface 37 and a radial shoulder or base 38. The cylindrical surface 37 is precision formed with a diameter which closely fits the outside diameter of the stator laminations 16 which have a generally circular outer periphery. For example, this fit is arranged so that there is between 0.002 inch interference to 0.001 clearance between this surface 37 and the outside surface of the laminations 16 when the outside laminations have a diameter of 2.368 inch. This close fit ensures that the end housing 13 and stator lamination stack 16 are concentric with one another within an acceptable dimensional tolerance. The front end housing 14 has a construction similar to the described rear housing 13. The front housing includes a circular end wall 41 and an integral . axially extending cylindrical sidewall 42. A central boss 43 in the end wall 41 carries a respective bearing 32 preferably identical to the bearing of the rear housing 13. A counterbore 44 at an edge of the sidewall 42 remote from the end wall 41 includes a cylindrical surface 46 and a radial shoulder or base surface 47. Like the analogous surface 37 of the rear housing 13, the surface 46 is dimensioned to provide a close fit with the outside diameter of the stator laminations 16 to maintain concentricity of these components. A cylindrical lip or skirt 48 extends integrally from the sidewall 42 away from the respective end wall towards the opposed rear housing 13. A cylindrical inside surface 49 of the skirt 48 is dimensioned to closely fit the outside diameter of the rear housing sidewall 29 as illustrated in FIG. 1. When the end housings 13 and 14 are assembled on the stator laminations 16 the counterbore shoulder surfaces 38, 47 tightly engage adjacent radial faces of the laminations 16. This is tight engagement.

In accordance with an important aspect of the invention, the axial length of the stack of laminations 16 varies depending on the desired power output of the motor 10 (it being understood that the profile of the laminations remains the same). In one group or family of motors, this stack length dimension may involve, for example, three different dimensions of 0.625 inch, .750 inch and 1.00 inch for three separate motor capacities. The length of the skirt 48, as measured by the axial length of its inside surface 49, is at least slightly longer than the range of these three stack length dimensions, namely, at least greater than 0.375 inch for the example given. Because the length of the skirt 48 is greater than the variation in the axial length of the lamination 16, the same end housings 13, 14 can be used for each size motor while such laminations are always fully enclosed by the housing sidewalls 29, 42 and the skirt 48. It will be understood that the various components are arranged so that in the case of the longest axial length of the lamination 16, at least a small portion of the skirt 48 will be telescoped over the opposed sidewall 29.

Figure 4:
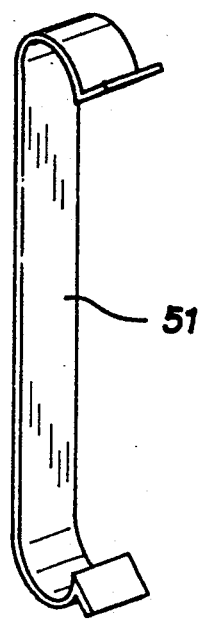
FIG. 4 is a perspective view of a typical tension spring used in the assembly of the motor.

The end housings 13, 14 and stator assembly 11 are held in assembled relation by a plurality of three identical tension spring clips 51 shown typically in FIG. 4. The clips 51 are each snapped into a pair of aligned slots 52, 53 molded in the exterior of the housing sidewalls 29 and 42. The clips 51 are formed from flat steel spring stock and have the shape of an elongated C. The hook at each end of a clip 51 is caught in an undercut 54, 55 associated with each slot 52, 53. The slots 52, 53 are angularly equally spaced about the periphery of the sidewalls 29 and 42. The front housing skirt 48 includes a set of three slots that afford clearance for the clips 51. The clips 51 are dimensioned so that in their axially oriented installed position they are tensioned to maintain an adequate compressive force on the end housings 13 and 14 to keep them adequately held in position against the laminations 16 to withstand normally expected service loads. Together, the front and rear end housings 13, 14 and the laminations 16 form the frame of the motor 10.

Figure 6:
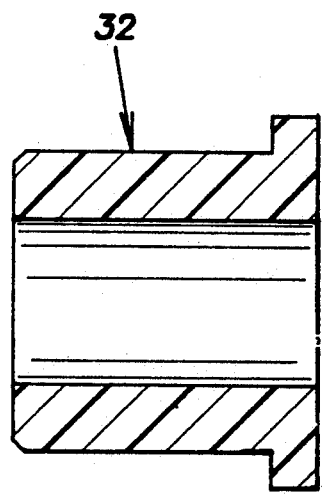
FIG. 6 is a longitudinal cross-sectional view of the shaft bearing of the motor taken in the plane 6—6 in FIG. 5.
Figure 5:
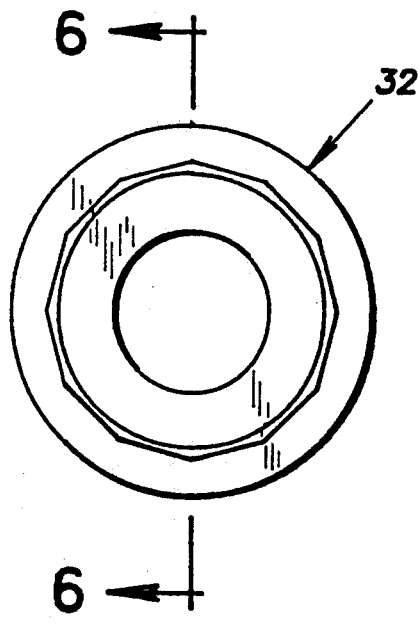
FIG. 5 is an end view of a typical shaft bearing.

Preferably, the shaft bearings 32 are identical and are shown in detail in FIGS. 5 and 6. Each bearing 32 is made, ideally, of a premium plastic material and is preferably a polyimide resin having solid additives of 10% polytetrafluorethylene and 15% graphite by weight, such as the product marketed by DuPont Company under the trademark VESPEL SP-211. Each bearing 32 has a polygonal exterior cross-section, in the illustrated case, having 12 equal sides. The shape of the bearing exterior is matched by the cross-section of a cavity 61, 62 in the central end wall bosses 31, 43. The bearings 32 and cavities 61, 62 are each dimensioned such that a bearing 32 can be pushed in cavity 61 or 62 with a relatively low force while the respective end housing 13 or 14 is at an elevated temperature of, for example 150° F. right after it is released from the injection mold cavity in which it is formed. In one example, the end housings 13 and 14 are formed of an engineering thermoplastic resin marketed by the DuPont Company under the registered trademark MINLON GRADE 1140C. In this construction, the bearing can be sized at 0.314±0.003 inch diameter over a circle circumscribing the corners of its equal sided polygon while the complementarily shaped bearing cavity can have a diameter of 0.308±0.002 for a circle circumscribing the corners of its equal sided polygonal shape. In this example, the bearing can have a diameter of 0.175 to 0.180 inch in its original configuration.

Figure 7:
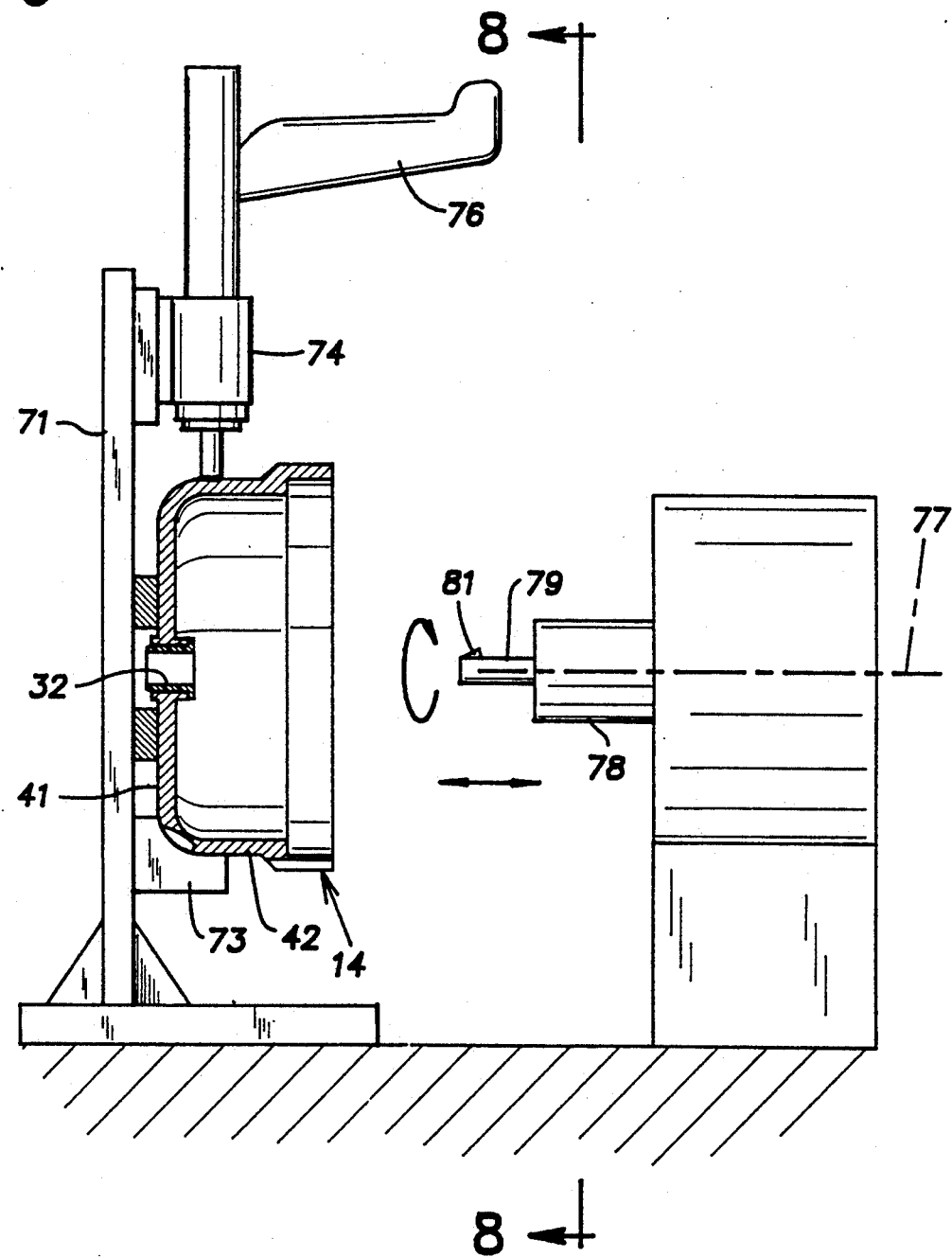
FIG. 7 is a schematic representation of apparatus for machining the bore and the shaft bearing.
Figure 8:
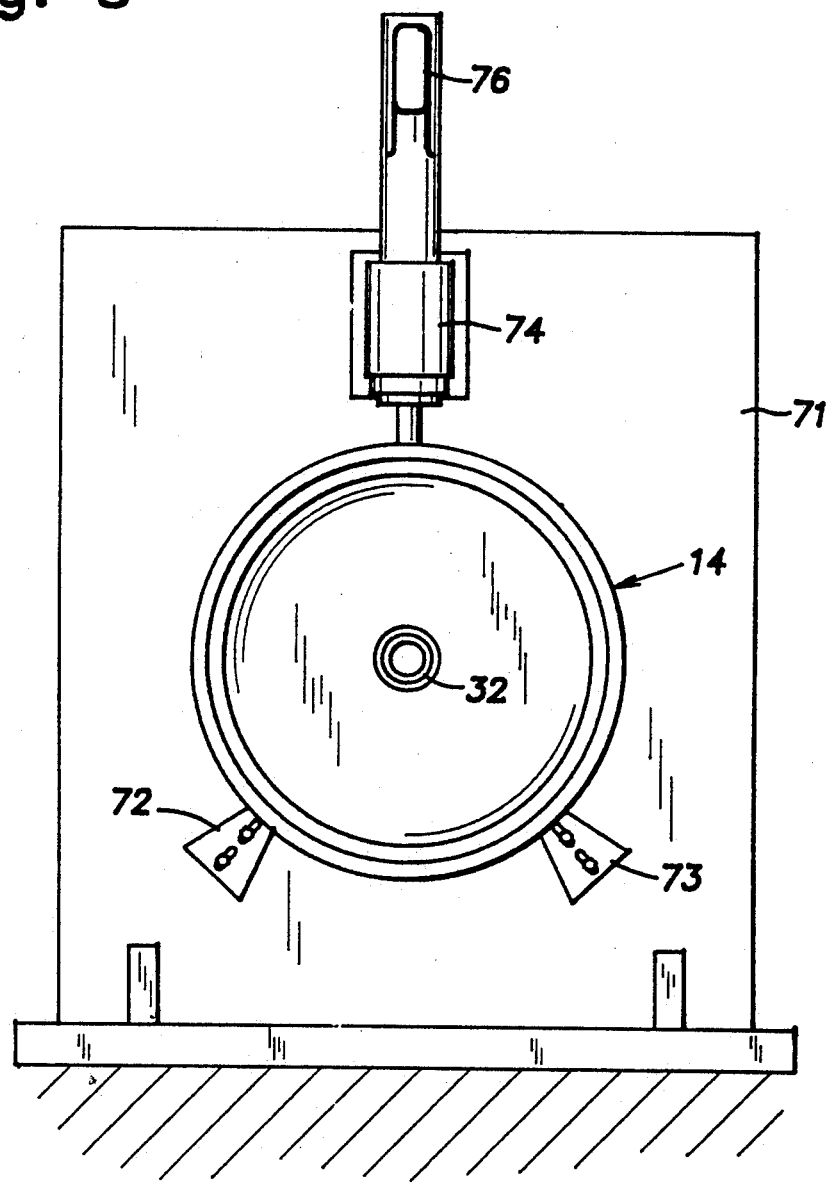
FIG. 8 is a view of the apparatus taken in the plane indicated by the arrows 8-8 in FIG. 7.

After a bearing 32 is forced into its respective housing cavity 61 or 62, it is finished by a boring process depicted in FIGS. 7 and 8. An end housing 13 or 14 is clamped on a fixture plate 71. Two fixed clamps 72, 73, and a manually operated plunger clamp 74, known in the art, are mounted on the plate 71 and serve to center and hold an end housing 13 or 14 in place during the bearing machining process. The end housing is clamped when a handle 76 operating a plunger is manually moved down to the illustrated position and the end housing is released when the handle is moved up 90°. The clamps 72, 73 and 74 are initially adjusted so that their clamping surfaces lie in a circle which is coincident to the axis 77 of a spindle 78. A boring bar 79 with a cutter 81 is carried on the spindle in a known manner wherein the cutter or tool is axially advanced and rotated in a controlled manner. The boring bar tool 81 is advanced and rotated through the bearing 32 to accurately machine its journal or bore. It can be seen that the bore formed in the bearing 32 is concentric with the cylindrical skirt 29 or 42 of the end housing 13 or 14 since the skirt is held concentric to the axis 77 of the spindle 78. This has the desired result of ensuring that the rotor 12 is supported concentrically in the stator laminations 16 since the later are directly held in the cylindrical skirts 29, 42.

The rotor shaft 24 has unique characteristics that, with the disclosed bearing material, achieve a very long service life at relatively low cost. It has been found that where the shaft 24 has a hardness of at least about 35-40 Rockwell C and has an exceptionally finely ground surface of at least an 8 micron finish and preferably a 5 micron finish, the life of the bearing and shaft combination and, therefore, the motor 10 will be at least in the order of ten years. As mentioned above, the bearing material is preferably filled with a solid lubricant or lubricants such as teflon and/or graphite so that the bearing is self-lubricating with solid material. Ideally, in the manufacture of the disclosed motor, after each motor is assembled, preferably within one eight-hour work shift of assembly, the motor shaft 24 is run in the bearings 32. This run-in is conveniently accomplished by test operating the motor 10 in an electrical performance quality check of 100% of the motors produced. During this run-in period in which electrical power consumption is monitored, the journal portions of the shaft 24 in the bearings 32 are coated with the solid material of the bearing and are thereby rendered corrosion resistant before exposure to a humid or otherwise corrosive environment for a period of time that would otherwise be sufficient to induce a harmful degree of corrosion. In this manner, the critical super-fine ground finish of the shaft 24 is protected. Since the shaft 24 is protected by a coating of the solid bearing material, it is preferably made from a relatively inexpensive steel such as plain cold roll carbon steel and no corrosion resistance need be afforded by a special composition or treatment of the motor shaft.

The disclosed motor requires very few assembly steps so that assembly labor is substantially reduced and/or automated assembly is greatly simplified Basically, the end housings 13, 14 are positioned over respective ends of the stator and rotor assemblies 11, 12 and the three spring clips 51 are radially snapped into position. No special tools or involved manipulation of the clips 51 are required to install the clips. As shown, the external clips 51, that are snapped over the undercuts 54, 55 avoid the necessity to be assembled axially through holes either in the end housings 13, 14 or the stator assembly 11. The clips 51 by not requiring holes or slots in the stator laminations 16 result in an electrically more efficient motor and reduce the cost to produce the laminations 16 since tooling costs for producing holes therein for conventional assembly of threaded fasteners are avoided Further, there is no requirement that the stator assembly 11 be angularly aligned with the end housings 13, 14 for installation of the clips 51 thereby simplifying motor assembly.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

I claim:

1. An electric motor comprising a stator including a pair of opposed thermoplastic end housings, a stator core stack of laminations, a shaft bearing in each of said end housings, a rotor including a shaft, the rotor shaft being rotatably supported in both of the bearings, the stator core stack of laminations being sandwiched between the end housings, a plurality of spring clips extending axially between an external of the end housings, the spring clips being constructed and arranged to be snapped into an assembly position on the end housings wherein sufficient axial tension in the clips is developed to maintain the end housings in compression towards the stator core lamination stack to resist relative movement therebetween under normally expected service conditions.

2. An electric motor including a stator assembly ad a rotor assembly, the stator assembly including a pair of opposed generally cup-shaped plastic end housings and a stack of stator core laminations disposed between said end housings with an axial length, the end housings including opposed surfaces for axially locating the stack of laminations, each end housing including a generally circular end wall and an integral circular skirt extending axially from the end wall towards the opposed end housing and enclosing a portion of the stator assembly, a bearing in the center of each end wall, the rotor assembly being disposed in said stator assembly and including a shaft having portions journalled in said bearings, the skirt of one of said end housings having a circular flange projecting axially from such skirt a distance that is at least the same order of magnitude as the axial spacing of said opposed surfaces, the flange being telescoped with the skirt of the other end housing in a manner whereby said end housings are usable with stator core laminations of different axial lengths varying substantially as much as 50% while the flange of said one skirt remains telescoped with the other skirt and while the opposed surfaces axially locate the stator core laminations.

* * * * *